W. B. CAMINADE.
SHREDDING MACHINE.
APPLICATION FILED MAY 4, 1907.
912,807.
Patented Feb. 16, 1909.
3 SHEETS—SHEET 1.
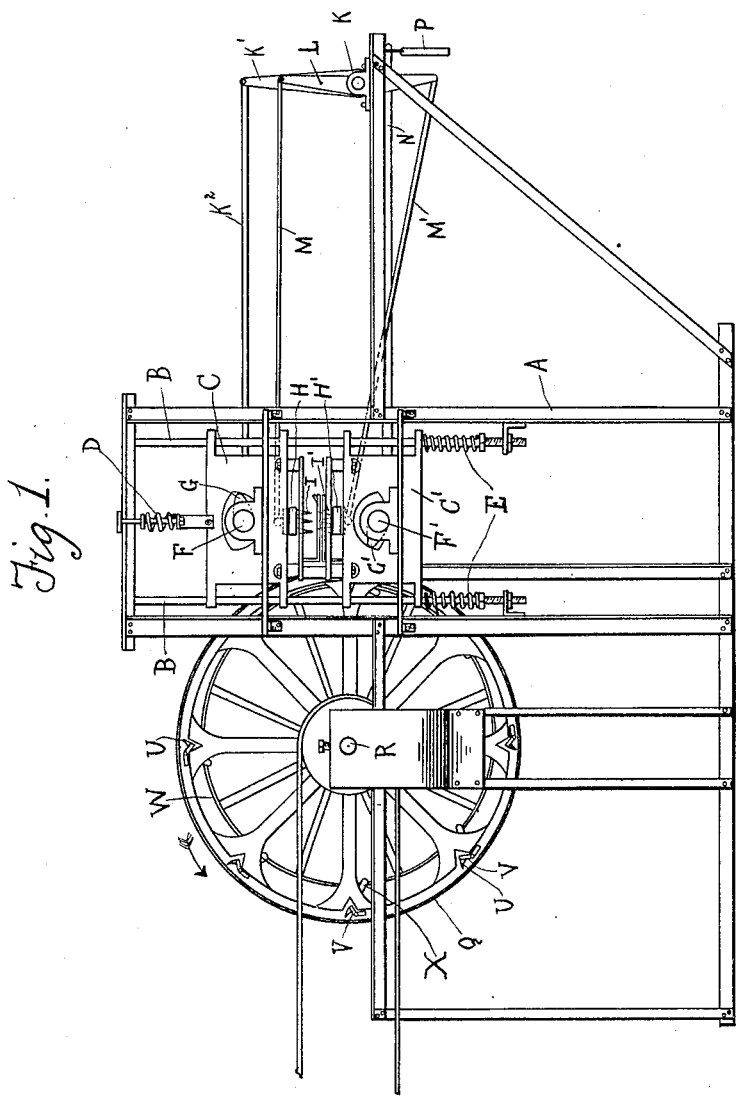
WITNESSES
INVENTOR
William B. Caminade
BY
ATTORNEY

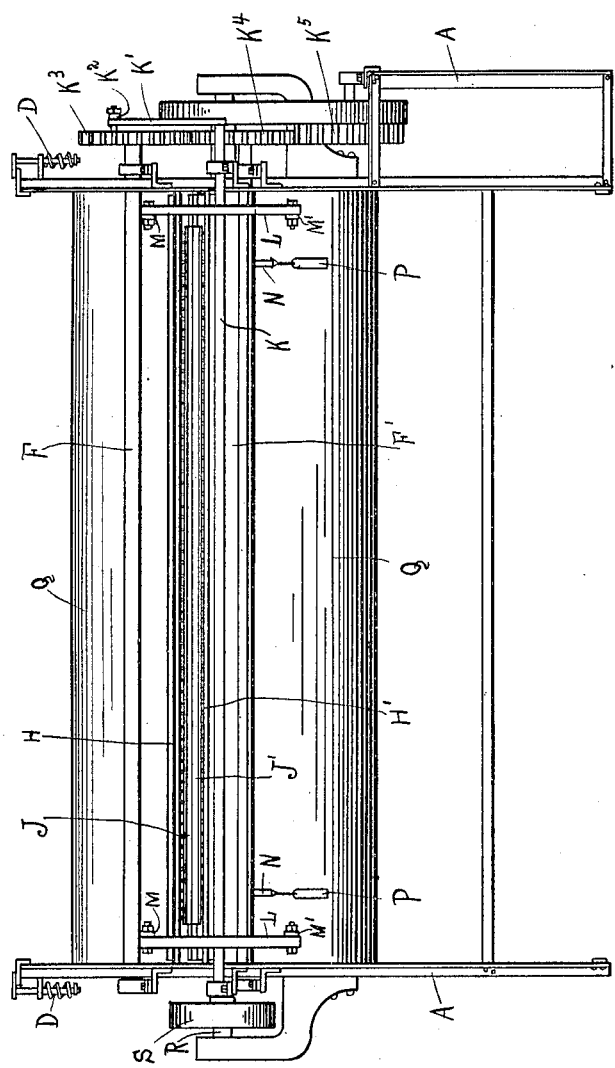

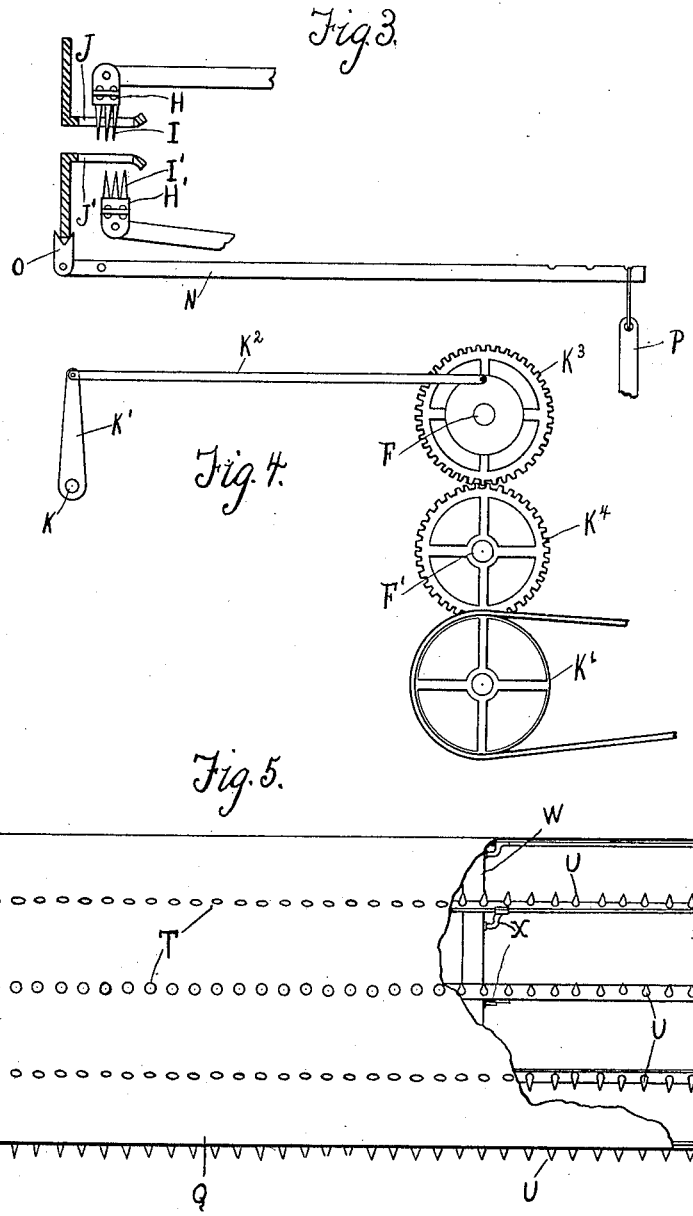

UNITED STATES PATENT OFFICE.

WILLIAM B. CAMINADE, OF CAMDEN, NEW JERSEY, ASSIGNOR TO ELIZABETH C. LEE, OF CAMDEN, NEW JERSEY.

SHREDDING-MACHINE.

No. 912,807.      Specification of Letters Patent.      Patented Feb. 16, 1909.

Application filed May 4, 1907. Serial No. 371,902.

*To all whom it may concern:*

Be it known that I, WILLIAM B. CAMINADE, a citizen of the United States, residing at Camden, county of Camden, and State of New Jersey, have invented a certain new and useful Improvement in Shredding-Machines, of which the following is a specification.

My invention relates to a new and useful improvement in shredding machines, and has for its object to so construct such a machine that it will automatically feed rags and like material to a shredding drum in which series of teeth are so arranged as to engage the material, shredding the same, and then release their hold thereon, thus overcoming the disadvantages which have heretofore been experienced in this class of machines of the feed rolls clogging and driving material through without being properly shredded.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the acompanying drawing forming a part of this specification, in which—

Figure 1, is a side elevation of a machine made in accordance with my improvement; Fig. 2, a front view thereof; Fig. 3, a detail view of the feeding teeth and the mechanism for operating the same; Fig. 4, a detail view of the train of gears, crank and rock shaft for giving the feeding teeth their reciprocating motion, and Fig. 5, a detail view of the shredding drum, a portion of the casing thereof being broken away so as to show the shredding teeth and the bars by which said teeth are carried.

In carrying out my invention as here embodied, A represents the frame which may be of any suitable design for supporting the operating parts of the machine.

B are guide-rods, one pair of which is located at each side of the machine and has fitted to slide thereon the follower blocks C and C', the former being normally forced downward by the coil springs D while the latter is normally forced upward by the coil springs E, it being understood that there is a pair of these blocks at each side of the machine.

F and F' represent two shafts which are journaled in suitable bearings upon the frame, and these shafts have secured thereon the cams G and G' respectively which are adapted to act upon the cam surfaces formed within the blocks C and C', and by so doing force said blocks against the action of the springs D and E as will be readily understood, suitable gearing being provided for causing the shafts F and F' to revolve in unison.

H and H' are feed bars fitted to slide horizontally upon the follower blocks C and C' respectively, and these bars are provided with the feeding teeth I and I' which project through slots in the feed plates J and J' so as to permit these teeth in their fourway movement which will be hereafter explained to alternately engage the material to be fed, thrust forward between the feed plates and then be drawn from said material.

K represents a rock shaft journaled upon the forward end of the frame and upon this shaft is secured the two double levers L, the upper portion of each lever being connected by the rod M with the feed bar H, while the lower ends of each of these double levers are connected by the rods M' with the feed bar H'; thus when the shaft K is rocked back and forth within its bearings the double levers will through the rods M and M' impart to the feed bars a to and fro movement upon their respective blocks C and C', and this to and fro movement of each of the feed bars is so timed that the bar will be given a forward movement when it has been moved toward the material being fed for engaging the teeth with said material and then be given a backward movement when said follower blocks are moved away from the work, and by this fourway movement of each feed bar each set of teeth will be alternately thrust through one of the feed plates into the material, moved forward, withdrawn from the material, moved backward and again thrust into the material.

The feed plate J is stationary while the feed plate J' has a slight vertical movement and is normally forced upward toward the plate J by the lever N through the links O upon which the lower edge of the plate J' rests, said lever having a weight P suspended upon its outer end and adjusted upon said lever so as to vary the pressure upon the feed plate.

As the material is fed forward between the feed plates it is necessary that it shall be shredded and drawn from said plates and afterward deposited in its shredded and fluffy condition in the form of what is known as "waste, fiber" or the like. To accomplish this I mount the cylinder Q upon the shaft R, which latter is held stationary in its bearings while the sleeved hubs of the cylinder revolve around said shaft, a pulley S being secured upon one of the sleeved hubs by means of which rotation may be imparted to the cylinder in the direction of the arrow marked adjacent thereto. The outer surface of the cylinder Q has formed therethrough the series of holes T through which the shredding teeth U are adapted to pass, and each series of these shredding teeth are carried by a bar V hinged within the cylinder so that the teeth may be swung outward through said holes or withdrawn inward below the surface of the cylinder.

W represents an eccentric which is secured upon the shaft R so as to remain stationary therewith, and the bars V are provided with lugs X the ends of which run in the groove of the eccentric, and said eccentric is so placed relative to the center of the cylinder that when said cylinder revolves the bars V will be swung outward as they approach the feed plates J and J' and will be swung inward as they recede from said plates, thus as before described causing the shredding teeth U to be projected through the surface of the cylinder as they approach the feed plates thus putting them in a position to engage the material being forced through said feed plates by the feeding teeth I and I', and as these feed plates hold the material under a certain amount of pressure the teeth when engaging with said material will tear and shred or fiberize the same, carrying it in its shredded condition from the feed plates to the opposite side of the cylinder where it will be deposited in any suitable receptacle by the shredding teeth being drawn into the cylinder, leaving the material free to fall from the latter.

The rock shaft K is given its oscillating movements for reciprocating the feed bars H and H' by the lever K' secured upon said shaft, said lever being connected by the rod K² to a crank upon the gear wheel K³, the latter being secured upon the shaft F; this gear wheel K³ meshes with the gear K⁴ secured upon the shaft F' thus causing the shafts F and F' to revolve in unison, and the gear wheel K⁴ meshes with the gear wheel K⁵ which revolves with the pulley K⁶, the latter being driven by belt or other means from the pulley S' secured upon one of the sleeved hubs of the cylinder Q, but of course I do not wish to be limited to any particular train of gears or belts for transmitting power from one part of the machine to another as these details might be varied within reasonable limits without departing from the spirit of my invention.

Having thus fully described my invention, what I claim as new and useful, is—

1. In a machine of the character described, two feed plates, one of which is movable, two feed bars, means for imparting a fourway motion to each of said feed bars, teeth carried by the feed bars, adapted to project through slots formed in the feed plates, and means for shredding the material, as fed.

2. In a machine of the character described, the combination of a stationary feed plate, a movable feed plate, means for forcing said movable feed plate toward the stationary feed plate, two follower blocks, means for reciprocating said follower blocks, a feed bar carried by each of said blocks, teeth projecting from said bars, means for imparting to said bars a sliding movement upon their follower blocks, and means for shredding the material, as fed.

3. In a machine of the character described, the combination of a stationary feed plate, a movable feed plate means for forcing said movable feed plate toward the stationary feed plate, two follower blocks, means for reciprocating said follower blocks, a feed bar carried by each of said blocks, teeth projecting from said bars, means for imparting to said bars a sliding movement upon their follower blocks and a shredding mechanism adapted to receive the material from the feeding device and shredding the same, as specified.

4. In a machine of the character described, the combination of a suitable frame, follower blocks fitted to slide vertically within said frame, springs for forcing said blocks in one direction cams for moving said blocks in the opposite direction, feed bars fitted to slide upon said blocks, feed teeth carried by said bars, means for sliding said bars back and forth upon the blocks, a stationary feed plate, a movable feed plate, means for forcing the movable plate beyond the stationary plate and shredding mechanism adapted to receive the material from the feeding machine as and for the purpose set forth.

5. In combination with a shredding mechanism of the character described, a stationary feed plate, a movable feed plate, means for forcing said movable feed plate beyond the stationary feed plate, two feed bars, teeth projecting from said feed bars, and means for imparting a fourway motion to said feed bars whereby the teeth carried thereby will be alternately carried through slots in the feed plates, as and for the purpose set forth.

In testimony whereof, I have hereunto affixed my signature in the presence of two subscribing witnesses.

WILLIAM B. CAMINADE.

Witnesses.
JOSEPH C. SMITH,
S. M. GALLAGHER.